(12) United States Patent
Kobashi (10) Patent No.: US 12,391,127 B2
(45) Date of Patent: Aug. 19, 2025

(54) VEHICLE CONTROL APPARATUS FOR MOTOR NOISE SUPPRESSION AND TORQUE CONTROL, ELECTRIC VEHICLE, AND NON-TRANSITORY RECORDING MEDIUM

(71) Applicant: SUBARU CORPORATION, Tokyo (JP)

(72) Inventor: Kento Kobashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 18/318,237

(22) Filed: May 16, 2023

(65) Prior Publication Data

US 2023/0391207 A1 Dec. 7, 2023

(30) Foreign Application Priority Data

Jun. 2, 2022 (JP) .................................. 2022-090185

(51) Int. Cl.
*B60L 15/20* (2006.01)
*B60W 10/08* (2006.01)
*B60W 10/10* (2012.01)

(52) U.S. Cl.
CPC ......... *B60L 15/2045* (2013.01); *B60W 10/08* (2013.01); *B60W 10/10* (2013.01);
(Continued)

(58) Field of Classification Search
CPC .. B60L 15/20; B60L 15/2045; B60L 2240/12; B60L 2240/421; B60L 2240/423; B60L 2240/48; B60L 2270/10; B60L 2270/14; B60L 2270/142; B60W 10/08; B60W 10/10; B60W 2510/081; B60W 2510/083; B60W 2510/1005; B60W 2710/083; B60W 2710/1005
See application file for complete search history.

(56) References Cited

U.S. PATENT DOCUMENTS 5,489,003 A 2/1996 Ohyama et al.

FOREIGN PATENT DOCUMENTS

| JP | H05-336618 A | | 12/1993 |
|----|--------------|---|---------|
| JP | 2006231977 A | * | 9/2006 |
| JP | 2019-97336 A | | 6/2019 |

OTHER PUBLICATIONS

Machine Translation of JP 2006231977 A (Year: 2006).*

* cited by examiner

*Primary Examiner* — Scott A Browne
*Assistant Examiner* — Jisun Choi
(74) *Attorney, Agent, or Firm* — Rimon P.C.

(57) ABSTRACT

A control apparatus for a vehicle is be applied to an electric vehicle. The control apparatus includes one or more processors and one or more memories communicably coupled to the one or more processors. The one or more processors are configured to: control a rotational speed of a drive motor of the electric vehicle to cause a frequency of a motor noise to be generated from the drive motor to be less than a predetermined value, when a vehicle speed of the electric vehicle is in a predetermined low vehicle speed region; and control the rotational speed of the drive motor to cause an electric power efficiency of the drive motor to be equal to or higher than a predetermined efficiency, when the vehicle speed of the electric vehicle is in a predetermined high vehicle speed region.

8 Claims, 4 Drawing Sheets

(52) U.S. Cl.
CPC ..... *B60L 2240/12* (2013.01); *B60L 2240/421* (2013.01); *B60L 2240/423* (2013.01); *B60L 2240/48* (2013.01); *B60W 2510/081* (2013.01); *B60W 2510/1005* (2013.01); *B60W 2710/081* (2013.01); *B60W 2710/1005* (2013.01); *B60W 2710/1061* (2013.01); *B60W 2720/10* (2013.01)

VEHICLE CONTROL APPARATUS FOR MOTOR NOISE SUPPRESSION AND TORQUE CONTROL, ELECTRIC VEHICLE, AND NON-TRANSITORY RECORDING MEDIUM

CROSS-REFERENCE TO RELATED APPLICATIONS

The present application claims priority from Japanese Patent Application No. 2022-090185 filed on Jun. 2, 2022, the entire contents of which are hereby incorporated by reference.

BACKGROUND

The disclosure relates to a control apparatus for a vehicle, an electric vehicle, and a non-transitory recording medium.

An example electric vehicle that travels by an output torque outputted from a drive motor includes a transmission that performs shifting on an output rotation from the drive motor, and so controls the transmission that a drive torque to be transmitted to drive wheels becomes a requested drive torque. For example, reference is made to Japanese Unexamined Patent Application Publication Nos. 2019-97336 and H05-336618.

SUMMARY

An aspect of the disclosure provides a control apparatus for a vehicle. The control apparatus is to be applied to an electric vehicle and configured to control driving of the electric vehicle. The electric vehicle is configured to transmit an output torque outputted from a drive motor to a drive wheel via a transmission. The control apparatus includes: one or more processors; and one or more memories communicably coupled to the one or more processors. The one or more processors are configured to: control a rotational speed of the drive motor to cause a frequency of a motor noise to be generated from the drive motor to be less than a predetermined value and control a transmission ratio of the transmission to cause a drive torque to be transmitted to the drive wheel to be a requested drive torque, when a vehicle speed of the electric vehicle is in a predetermined low vehicle speed region; and control the rotational speed of the drive motor to cause an electric power efficiency of the drive motor to be equal to or higher than a predetermined efficiency and control the transmission ratio of the transmission to cause the drive torque to be transmitted to the drive wheel to be the requested drive torque, when the vehicle speed of the electric vehicle is in a predetermined high vehicle speed region.

An aspect of the disclosure provides an electric vehicle configured to transmit an output torque outputted from a drive motor to a drive wheel via a transmission. The electric vehicle includes a control apparatus configured to: control a rotational speed of the drive motor to be less than a predetermined rotation threshold at which a frequency of a motor noise to be generated from the drive motor becomes less than a predetermined value and control a transmission ratio of the transmission to cause a drive torque to be transmitted to the drive wheel to be a requested drive torque, when a vehicle speed of the electric vehicle is in a predetermined low vehicle speed region; and control the rotational speed of the drive motor to cause an electric power efficiency of the drive motor to be equal to or higher than a predetermined efficiency and control the transmission ratio of the transmission to cause the drive torque to be transmitted to the drive wheel to be the requested drive torque, when the vehicle speed of the electric vehicle is in a predetermined high vehicle speed region.

An aspect of the disclosure provides a non-transitory computer readable recording medium containing a computer program to be applied to a control apparatus for an electric vehicle. The electric vehicle is configured to transmit an output torque outputted from a drive motor to a drive wheel via a transmission. The computer program causes, when executed by one or more processors, the one or more processors to implement a method. The method includes: determining whether a vehicle speed of the electric vehicle is in a predetermined low vehicle speed region or a predetermined high vehicle speed region; controlling a rotational speed of the drive motor to be less than a predetermined rotation threshold at which a frequency of a motor noise to be generated from the drive motor becomes less than a predetermined value, and a transmission ratio of the transmission to cause a drive torque to be transmitted to the drive wheel to be a requested drive torque, when the vehicle speed of the electric vehicle is in the low vehicle speed region; and controlling the rotational speed of the drive motor to cause an electric power efficiency of the drive motor to be equal to or higher than a predetermined efficiency, and the transmission ratio of the transmission to cause the drive torque to be transmitted to the drive wheel to be the requested drive torque, when the vehicle speed of the electric vehicle is in the high vehicle speed region.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A drive noise generated by driving of a drive motor (hereinafter, also referred to as a "motor noise") is basically a high-frequency noise, and can give a sense of discomfort to an occupant such as a driver who drives a vehicle.

It is desirable to provide a control apparatus for a vehicle, an electric vehicle, and a non-transitory recording medium containing a computer program that make it possible to reduce a motor noise to be heard by an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<1. Example Features of at Least One Embodiment of Disclosure>

(1-1) A control apparatus for a vehicle according to at least one embodiment of the disclosure is to be applied to an electric vehicle and configured to control driving of the electric vehicle. The electric vehicle is configured to transmit an output torque outputted from a drive motor to a drive wheel via a transmission. The control apparatus includes:

one or more processors; and one or more memories communicably coupled to the one or more processors.

The one or more processors are configured to:

control a rotational speed of the drive motor to cause a frequency of a motor noise to be generated from the drive motor to be less than a predetermined value and control a transmission ratio of the transmission to cause a drive torque to be transmitted to the drive wheel to be a requested drive torque, when a vehicle speed of the electric vehicle is in a predetermined low vehicle speed region; and control the rotational speed of the drive motor to cause an electric power efficiency of the drive motor to be equal to or higher than a predetermined efficiency and control the transmission ratio of the transmission to cause the drive torque to be transmitted to the drive wheel to be the requested drive torque, when the vehicle speed of the electric vehicle is in a predetermined high vehicle speed region.

At least one embodiment of the disclosure also provides a control apparatus for a vehicle to be mounted on the vehicle (or the electric vehicle) and configured to execute the above-described processes, an electric vehicle including the control apparatus, a computer program configured to execute the above-described processes, a non-transitory recording medium containing the computer program, or a method of controlling a vehicle that executes the above-described processes.

With the above configuration, the control apparatus for the vehicle, the electric vehicle, the computer program, the non-transitory recording medium, or the method of controlling the vehicle according to at least one embodiment of the disclosure makes a process of setting the rotational speed of the drive motor different between when the vehicle speed is in the low vehicle speed region and when the vehicle speed is in the high vehicle speed region. For example, when the vehicle speed is in the low vehicle speed region, at least one embodiment of the disclosure so controls the rotational speed of the drive motor that the frequency of the motor noise to be generated from the drive motor becomes less than the predetermined value. Thus, it is possible to cause the frequency of the motor noise generated from the drive motor to be overlapped with a frequency band of a background noise which is to be heard by an occupant, such as a driver who drives the vehicle, as being relatively large, which helps to allow the motor noise to be blended into the background noise. When the vehicle speed is in the high vehicle speed region, the generated motor noise easily blends into the background noise even if the rotational speed of the drive motor becomes relatively large. Accordingly, at least one embodiment of the disclosure so controls the rotational speed of the drive motor that the electric power efficiency of the drive motor becomes equal to or higher than the predetermined efficiency when the vehicle speed is in the high vehicle speed region. Hence, it helps to reduce the motor noise to be heard by the occupant and to improve the electric power efficiency.

As used herein, the term "low vehicle speed region" may be any region in which the vehicle speed is set to a relatively slow speed, and in which a level of the background noise generated by traveling of the vehicle becomes equal to or less than a predetermined level. As used herein, the term "high vehicle speed region" may be any region in which the vehicle speed is set to a relatively high speed, and in which the vehicle speed is set to any speed that is higher than the vehicle speed of at least the "low vehicle speed region".

As used herein, the term "background noise" may mean a noise generated upon traveling of the vehicle other than the motor noise to be generated from the drive motor, such as a road noise or a wind noise. In some embodiments of the disclosure, the term "background noise" may mean a noise that can be heard in a vehicle interior, such as the road noise or the wind noise.

The term "transmission ratio" may refer to a ratio of a rotational speed on an input side of the transmission to a rotational speed on an output side of the transmission. For example, the transmission ratio where the input side is to be rotated three times in order to rotate the output side by one rotation is 3.

The term "electric power efficiency of the drive motor" may refer to a magnitude of an electric power loss upon driving the drive motor. The electric power efficiency decreases as the electric power loss occurring in an inverter that controls an electric power supply to the drive motor, the drive motor, and an electric wiring line increases. The electric power efficiency or the electric power loss may be estimated based on a resistance such as a wiring resistance or a device resistance.

(1-2) In some embodiments, the one or more processors may be configured to:

set the rotational speed of the drive motor in the low vehicle speed region to a preset first value; and set the rotational speed of the drive motor in the high vehicle speed region to a preset second value.

This configuration helps to allow a process of setting a target rotational speed of the drive motor to be simplified, and helps to adjust a target transmission ratio simply based on the requested drive torque, which in turn helps to facilitate a drive control of the vehicle.

(1-3) In some embodiments, the one or more processors may be configured to set the rotational speed of the drive motor in the low vehicle speed region, the high vehicle speed region, or both, based on a frequency of a predetermined noise generated from the electric vehicle other than the motor noise to be generated from the drive motor.

This configuration helps to reliably reduce the motor noise to be heard by the occupant in response to a magnitude of the background noise generated in accordance with the vehicle speed.

<2. Vehicle Configuration>

Figure 1:
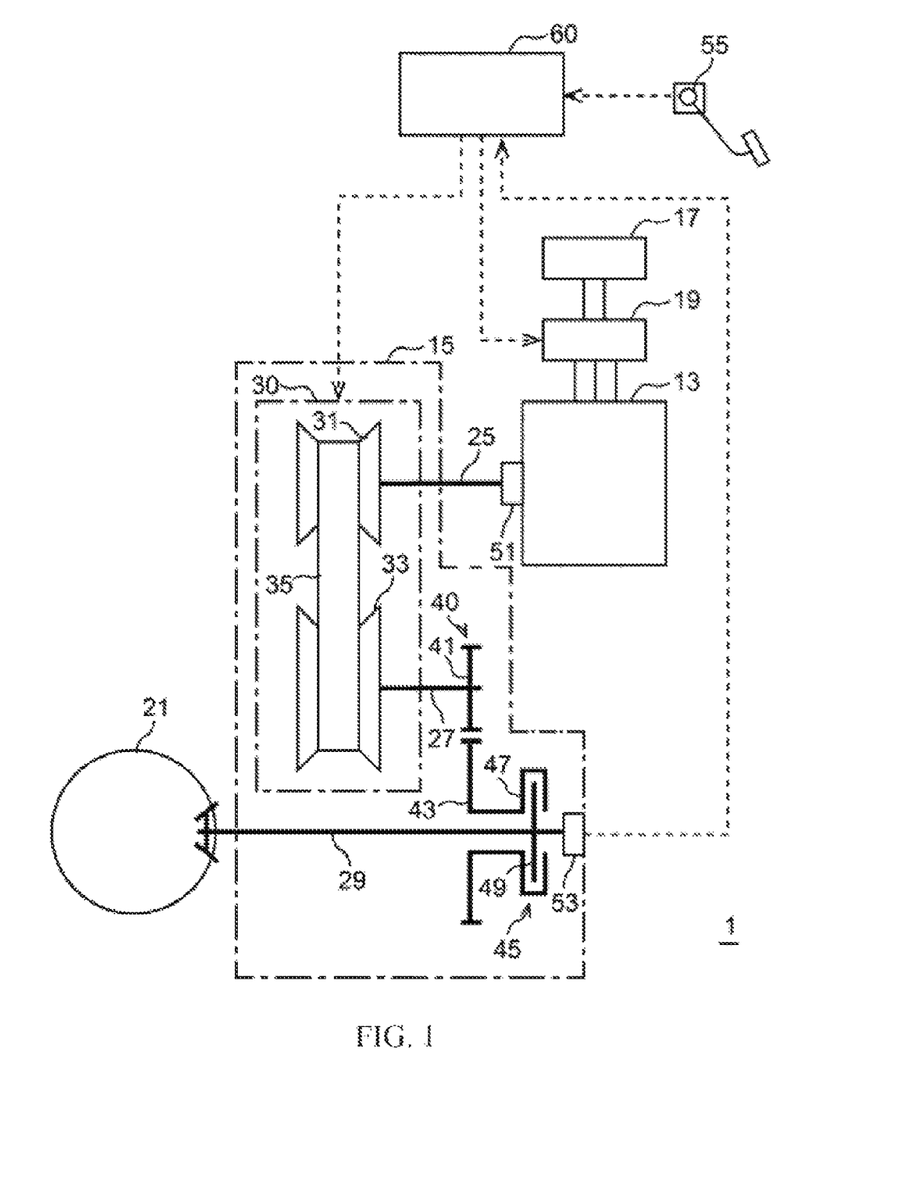
FIG. 1 is a schematic diagram illustrating a configuration example of an electric vehicle including a control apparatus for a vehicle according to one example embodiment of the disclosure.

Referring to FIG. 1, a configuration of a vehicle including a control apparatus for a vehicle according to an example embodiment of the disclosure will be described. FIG. 1 is a schematic diagram illustrating a configuration of an electric vehicle (hereinafter, also simply referred to as a "vehicle") 1. The vehicle 1 may include a drive motor 13, a transmission 15, a battery 17, an inverter 19, drive wheels 21, and a control apparatus 60. The vehicle 1 may be the electric vehicle including the drive motor 13 as a source of a drive force.

The drive motor 13 may be, for example, a three-phase AC motor. A motor rotation shaft 25 serving as an output shaft of the drive motor 13 may be coupled to the transmission 15. The battery 17 may be an electric power source that stores an electric power to be supplied to the drive motor 13, and may be electrically coupled to the inverter 19. The inverter 19 may be electrically coupled to the drive motor 13. The inverter 19 may convert the electric power of the battery 17 into a three-phase AC electric power, and supply the three-phase AC electric power to the drive motor 13. The drive motor 13 may rotate the motor rotation shaft 25 by the electric power supplied via the inverter 19. The drive motor 13 may output the drive force via the motor rotation shaft 25. The motor rotation shaft 25 may transmit the drive force outputted from the drive motor 13 to the transmission 15. The drive motor 13 may include a motor rotational speed sensor 51 that detects a rotational speed of the motor rotation shaft 25.

The transmission 15 may be provided between the motor rotation shaft 25 and the drive wheels 21. The transmission 15 may perform shifting on the rotational speed of the motor rotation shaft 25, and transmit the drive torque outputted from the drive motor 13 to the drive wheels 21. The transmission 15 may include a transmission mechanism 30, a secondary shaft 27, a secondary gear mechanism 40, an output clutch 45, and an output shaft 29. In the example embodiment, the transmission mechanism 30 may be a continuously variable transmission mechanism. Alternatively, the transmission mechanism 30 may be a stepped transmission mechanism.

The transmission mechanism 30 may include a primary pulley 31, a secondary pulley 33, and a transmission belt 35. The transmission belt 35 may be wound around the primary pulley 31 and the secondary pulley 33. The transmission belt 35 may transmit a rotation of the primary pulley 31 to the secondary pulley 33, and rotate the secondary pulley 33 in response to the rotation of the primary pulley 31. The transmission mechanism 30 may adjust a ratio of a rotational speed of the secondary pulley 33 to a rotational speed of the primary pulley 31 by changing pulley widths of the respective primary pulley 31 and secondary pulley 33. For example, the transmission 15 may include an unillustrated hydraulic circuit, and may change the pulley widths of the respective primary pulley 31 and secondary pulley 33 by controlling a hydraulic pressure to be supplied to pulley chambers provided in the respective primary pulley 31 and secondary pulley 33.

The motor rotation shaft 25 may be coupled to the primary pulley 31. The primary pulley 31 may rotate at the same rotational speed as the motor rotation shaft 25. In other words, the primary pulley 31 and the motor rotation shaft 25 may rotate together. In one example, an unillustrated clutch mechanism may be provided at an any position in the middle of the motor rotation shaft 25 to allow for cutting off of a connection between the drive motor 13 and the primary pulley 31.

The secondary shaft 27 may be coupled to the secondary pulley 33. The secondary shaft 27 may rotate at the same rotational speed as the secondary pulley 33. In other words, the secondary pulley 33 and the secondary shaft 27 rotate together. The rotational speed of the secondary shaft 27 may be reduced by the transmission mechanism 30 as compared with the rotational speed of the motor rotation shaft 25.

The secondary gear mechanism 40 may include a first secondary gear 41 and a second secondary gear 43. A secondary shaft 27 may be coupled to the first secondary gear 41. The first secondary gear 41 may rotate at the same rotational speed as the secondary shaft 27. The first secondary gear 41 and the second secondary gear 43 may be in mesh with each other. The rotational speed of the second secondary gear 43 may be reduced as compared with the rotational speed of the first secondary gear 41.

The output clutch 45 may include a first clutch plate 47 and a second clutch plate 49. The second secondary gear 43 may be coupled to the first clutch plate 47. The first clutch plate 47 may rotate together with the second secondary gear 43. The output shaft 29 may be coupled to the second clutch plate 49. The output shaft 29 may be coupled to the drive wheels 21.

When the first clutch plate 47 and the second clutch plate 49 are engaged, a power may be transmitted from the second secondary gear 43 to the output shaft 29. Thus, the output shaft 29 may rotate at the same rotational speed as the second secondary gear 43. The drive wheels 21 may rotate in response to the rotation of the output shaft 29. The transmission 15 may include an output rotational speed sensor 53 that detects the rotational speed of the output shaft 29.

The control apparatus 60 may serve as a device that executes a drive force control of the electric vehicle 1 as a result of execution of a computer program executed by a processor such as one or more CPUs (Central Processing Unit). The computer program may cause the processor to execute a later-described operation to be executed by the control apparatus 60. The computer program to be executed by the processor may be recorded in a non-transitory recording medium serving as a memory provided in the control apparatus 60. In some embodiments, the computer program to be executed by the processor may be recorded in a non-transitory recording medium built in the control apparatus 60. In some embodiments, the computer program to be executed by the processor may be recorded in any non-transitory recording medium externally attachable to the control apparatus 60.

Non-limiting examples of the non-transitory recording medium that records the computer program may include: a magnetic medium such as a hard disk, a floppy disk, or a magnetic tape; an optical recording medium such as CD-ROM (Compact Disk Read Only Memory), DVD (Digital Versatile Disk), or Blu-ray (Registered Trademark); a magneto-optical medium such as a floptical disk; a storage device such as RAM (Random Access Memory) or ROM (Read Only Memory); a flash memory such as an USB (Universal Serial Bus) memory; SSD (Solid State Drive); or any other medium that allows for storing of a program.

The control apparatus 60 may receive sensor signals of the motor rotational speed sensor 51 and the output rotational speed sensor 53. The control apparatus 60 may also receive a sensor signal of an accelerator sensor 55 that detects a pressing amount (e.g., an accelerator position) of an accelerator pedal.

<3. Control Apparatus>

Figure 2:
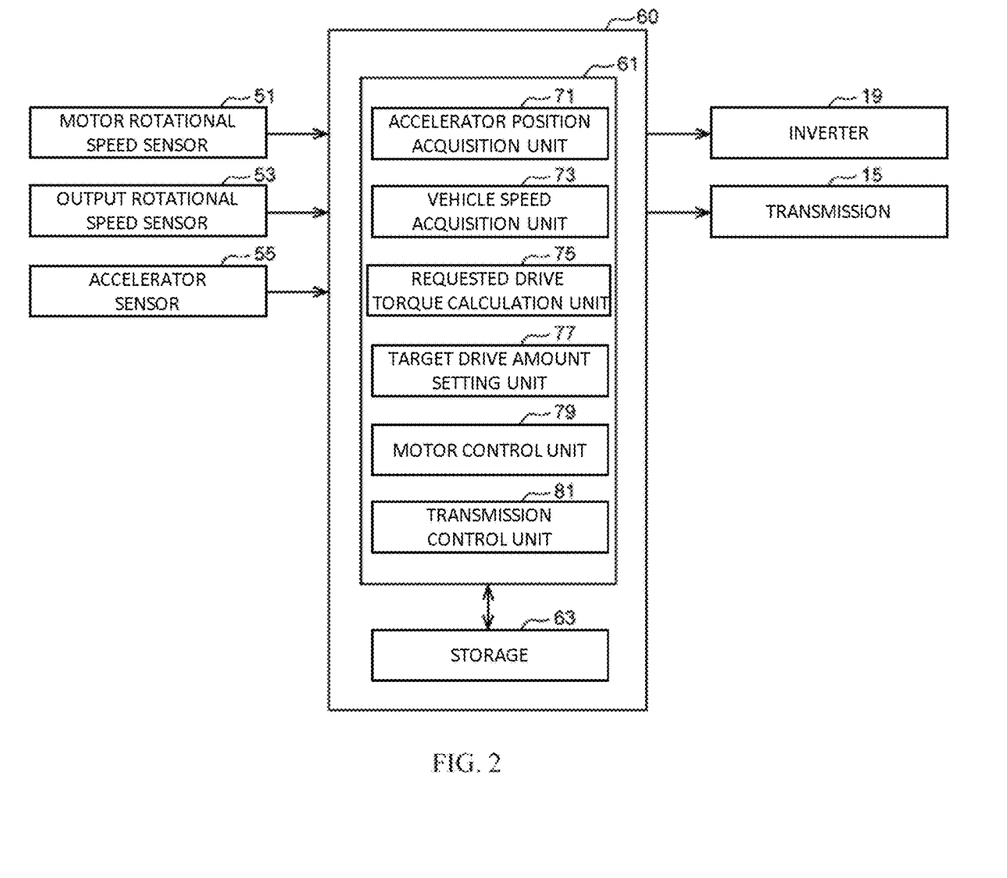
FIG. 2 is a block diagram illustrating a configuration of the control apparatus for the vehicle illustrated in FIG. 1.

Next, a configuration example of the control apparatus 60 will be described in detail. FIG. 2 is a block diagram illustrating a configuration of the control apparatus 60.

The control apparatus 60 may include a processing unit 61 and a storage 63. The processing unit 61 may include one or more processors, and execute processes that control driving of the drive motor 13 and the transmission 15. All or a part of the processing unit 61 may be updatable by firmware, for example. In some embodiments, all or a part of the processing unit 61 may be, for example, a program module to be executed by a command from a device such as CPU. The storage 63 may include one or more memories, such as RAM or ROM, communicably coupled to the processing unit 61, and store a computer program to be executed by the processing unit 61, various parameters to be used for an arithmetic process, and data on an arithmetic result. However, the number and a type of the storage 63 are not particularly limited.

The processing unit 61 may include an accelerator position acquisition unit 71, a vehicle speed acquisition unit 73, a requested drive torque calculation unit 75, a target drive amount setting unit 77, a motor control unit 79, and a transmission control unit 81. Operations of these respective units may be achieved by the execution of the computer program executed by the processor. In some embodiments, a part of these units may be configured by hardware such as an analog circuit.

[3-1. Accelerator Position Acquisition Unit]

The accelerator position acquisition unit 71 may execute an accelerator position acquisition process that acquires data on an amount of operation (an accelerator position) of the accelerator pedal operated by a driver who drives the vehicle 1. For example, the accelerator position acquisition unit 71 may acquire the data on the accelerator position, based on the sensor signal received from the accelerator sensor 55.

[3-2. Vehicle Speed Acquisition Unit]

The vehicle speed acquisition unit 73 may execute a vehicle speed acquisition process that acquires data on a speed of the vehicle 1. For example, the vehicle speed acquisition unit 73 may acquire the data on the vehicle speed, based on the sensor signal received from the output rotational speed sensor 53. It should be noted that a method of acquiring the vehicle speed is not limited to one example described above.

[3-3. Requested Drive Torque Calculation Unit]

The requested drive torque calculation unit 75 may execute a process of calculating a requested drive torque of the vehicle 1. A method of calculating the requested drive torque may be any of various known methods. For example, the requested drive torque may be calculated based on the accelerator position and by referring to a drive torque setting map. When the vehicle 1 is driven automatedly, the requested drive torque may be calculated based on a requested acceleration rate and by referring to the drive torque setting map. The requested acceleration rate may be calculated by a control device that controls the automated driving.

[3-4. Target Drive Amount Setting Unit]

The target drive amount setting unit 77 may set target values of drive amount of the drive motor 13 and the transmission 15. In the example embodiment, the target drive amount setting unit 77 may set the target value of a motor rotational speed of the drive motor 13 (i.e., a target rotational speed) and the target value of the transmission ratio of the transmission 15 (i.e., a target transmission ratio).

The target drive amount setting unit 77 may set the target rotational speed of the drive motor 13 based on the vehicle speed. Further, the target drive amount setting unit 77 may so set the target transmission ratio of the transmission 15 that the drive torque to be transmitted to the drive wheels 21 becomes the requested drive torque. For example, the target drive amount setting unit 77 may determine whether the vehicle speed is in the predetermined low vehicle speed region or the predetermined high vehicle speed region. When the vehicle speed is in the predetermined low vehicle speed region, the target drive amount setting unit 77 may set the target rotational speed of the drive motor 13 to be less than a predetermined rotation threshold at which a frequency of the motor noise to be generated from the drive motor 13 becomes less than a predetermined value. Further, the target drive amount setting unit 77 may so set the target transmission ratio of the transmission 15 that the drive torque to be transmitted to the drive wheels 21 becomes the requested drive torque. When the vehicle speed is in the predetermined high vehicle speed region, the target drive amount setting unit 77 may so set the target rotational speed of the drive motor 13 that the electric power efficiency of the drive motor 13 becomes equal to or higher than a predetermined efficiency. Further, the target drive amount setting unit 77 so set the target transmission ratio of the transmission 15 that the drive torque to be transmitted to the drive wheels 21 becomes the requested drive torque.

Thus, reducing the rotational speed of the drive motor 13 in a state where the vehicle speed is in the low vehicle speed region and where the background noise generated during the traveling of the vehicle 1 is small allows the motor noise generated to be a low frequency noise and thereby helps to reduce the motor noise to be heard by an occupant such as the driver. In a state where the vehicle speed is in the high vehicle speed region and where the background noise generated during the traveling of the vehicle 1 is large, the motor noise generated by the driving of the drive motor 13 is blended into the background noise even when the rotational speed of the drive motor 13 is increased, making it difficult to be heard by the occupant, which helps to allow the drive motor 13 to be driven at a rotational speed at which the electric power efficiency is high.

It should be noted that the term "predetermined efficiency" is not limited to a maximum efficiency, and may be set in advance to have an any desired value.

Figure 3:
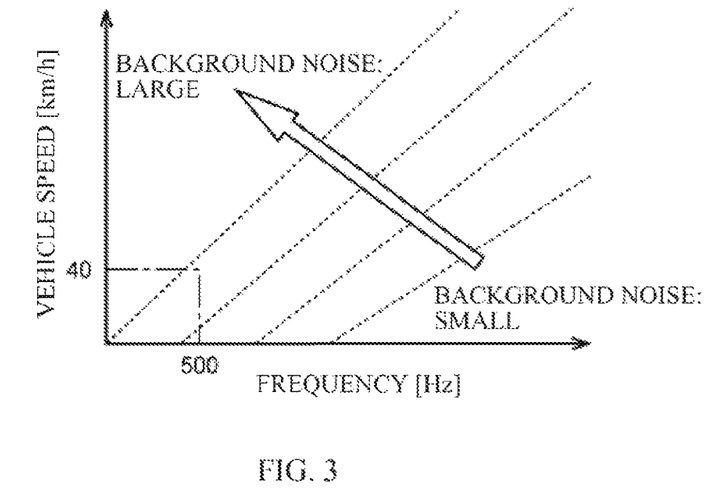
FIG. 3 is an explanatory diagram illustrating a relationship between a vehicle speed and a background noise.

FIG. 3 is an explanatory diagram illustrating a relationship between a vehicle speed and a frequency of the background noise. In a region where the vehicle speed is relatively low, the background noise at a low frequency is large, while the background noise decreases as the frequency of the background noise increases. Accordingly, lowering the frequency of the motor noise by setting the rotational speed of the drive motor 13 to a low rotational speed (e.g., causing the frequency of the motor noise to be less than 500 Hz in one example of FIG. 3) in a region in which the vehicle speed is relatively low (e.g., a region of 40 km/h or less in one example of FIG. 3) helps to cause the motor noise to be blended into the background noise. In a region in which the vehicle speed is relatively high, the background noise is large over a region from the low frequency to a high frequency, meaning that it is possible to cause the motor noise to be blended into the background noise even when the rotational speed of the drive motor 13 is set to a high rotational speed and the frequency of the motor noise is made high. Accordingly, in the region in which the vehicle speed is relatively high, the electric power efficiency of the drive motor 13 may be prioritized, and the drive motor 13 may be driven at the rotational speed at which the electric power efficiency is high.

Figure 4:
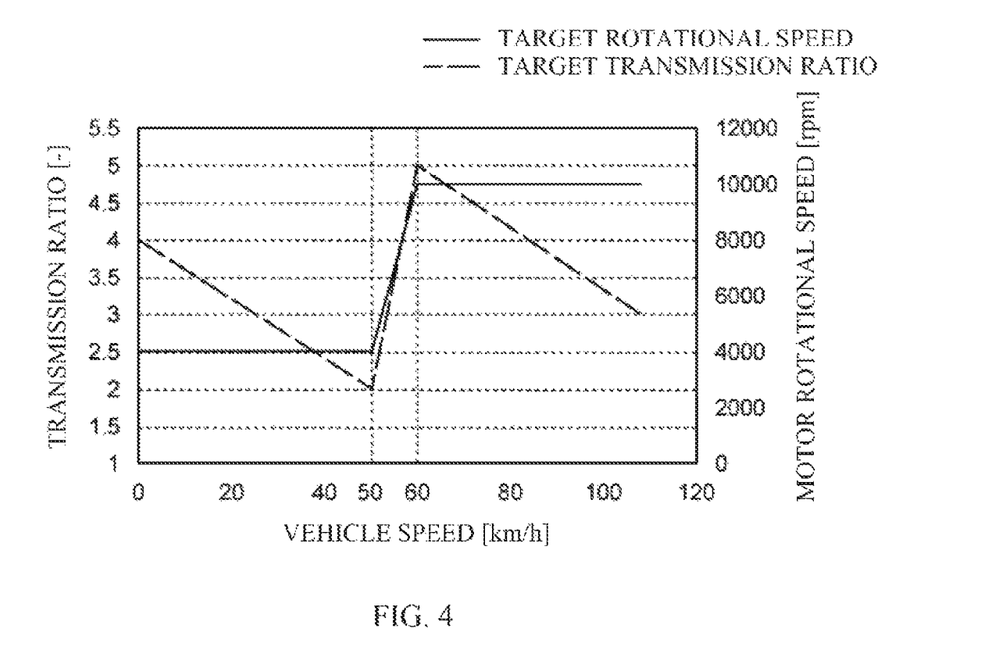
FIG. 4 is an explanatory diagram illustrating an example of setting a target rotational speed and a target transmission ratio to be performed by the control apparatus for the vehicle illustrated in FIG. 1.

FIG. 4 is an explanatory diagram illustrating an example of the target rotational speed of the drive motor 13 and the target transmission ratio of the transmission 15 that are set based on the vehicle speed.

In one example illustrated in FIG. 4, a region in which the vehicle speed is equal to or lower than 50 km/h may be set as the low vehicle speed region, and the target rotational speed of the drive motor 13 may be set to be 4,000 rpm 66.6 Hz) in the low vehicle speed region. The target rotational speed may be set in advance as a value less than the rotation threshold that is determined based on the relationship between the vehicle speed and the frequency of the background noise illustrated by way of example in FIG. 3 and that allows the motor noise generated from the drive motor 13 to be blended into the background noise. Further, in the low vehicle speed region, the target transmission ratio may be adjusted based on the requested drive torque, with the target rotational speed of the drive motor 13 being maintained at 4,000 rpm. The target transmission ratio may be set to a relatively small value as the vehicle speed increases.

In one example illustrated in FIG. 4, a region in which the vehicle speed is equal to or higher than 60 km/h may be set as the high vehicle speed region, and the target rotational speed of the drive motor 13 may be set to be 10,000 rpm 166.6 Hz) in the high vehicle speed region. The target rotational speed may be set in advance as a value at which the electric power efficiency of the drive motor 13 becomes equal to or higher than the predetermined efficiency. Further, in the high vehicle speed region, the target transmission ratio may be adjusted based on the requested drive torque, with the target rotational speed of the drive motor 13 being maintained at 10,000 rpm. The target transmission ratio may be set to a relatively small value as the vehicle speed increases.

In a region in which the vehicle speed exceeds 50 km/h and is less than 60 km/h, i.e., in a region between the low vehicle speed region and the high vehicle speed region, the target rotational speed of the drive motor 13 may be so set as to increase proportionally from 4,000 rpm to 6,000 rpm in response to the increase in the vehicle speed. In this region, the target transmission ratio may be so adjusted that the requested drive torque is achieved in response to the target rotational speed of the drive motor 13.

In one example illustrated in FIG. 4, the target rotational speed of the drive motor 13 in the low vehicle speed region may be set to a preset first value (e.g., 4,000 rpm in FIG. 4), and the target rotational speed of the drive motor 13 in the high vehicle speed region may be set to a preset second value (e.g., 10,000 rpm in FIG. 4). Using the fixed values set for the respective low vehicle speed region and high vehicle speed region as described above helps to simplify a process of setting the target rotational speed of the drive motor 13 and allow the target transmission ratio to be adjusted simply based on the requested drive torque, which in turn helps to facilitate a drive control of the vehicle 1.

In some embodiments, the target rotational speed of the drive motor 13 to be set may be changed based on the vehicle speed, in the low vehicle speed region, the high vehicle speed region, or both. For example, in the low vehicle speed region, the high vehicle speed region, or both, the rotational speed of the drive motor 13 may be set based on a frequency of a predetermined noise (e.g., the background noise) generated from the vehicle 1 other than the motor noise to be generated from the drive motor 13. As illustrated in FIG. 3, a frequency band at which the background noise increases varies depending on the vehicle speed. Accordingly, in each of the low vehicle speed region and the high vehicle speed region, the target rotational speed may be so set as to be smaller as the vehicle speed is lower, based on a frequency at which the background noise becomes larger than a predetermined level.

[3-5. Motor Control Unit]

The motor control unit 79 may control the electric power to be supplied to the drive motor 13 based on the target rotational speed of the drive motor 13 set by the target drive amount setting unit 77, and thereby control the driving of the drive motor 13. For example, the motor control unit 79 may control driving of switching devices provided in the inverter 19, and so control a voltage and a current of the three-phase AC electric power to be supplied to the drive motor 13 that the rotational speed of the drive motor 13 becomes the target rotational speed.

[3-6. Transmission Control Unit]

The transmission control unit 81 may control the transmission 15 based on the target transmission ratio of the transmission 15 set by the target drive amount setting unit 77, and thereby control the transmission ratio. For example, the transmission control unit 81 may control driving of electromagnetic control valves that control pressures in respective hydraulic chambers of the hydraulic circuit provided in the transmission 15, and so adjust the pulley widths of the respective primary pulley 31 and secondary pulley 33 that the transmission ratio becomes the target transmission ratio.

<4. Operation Example>

Next, an operation and processes to be performed by the control apparatus 60 according to the example embodiment will be described in detail. In the following description, an example will be described in which the target rotational speed of the drive motor 13 and the target transmission ratio of the transmission 15 are to be set based on one example illustrated in FIG. 4.

Figure 5:
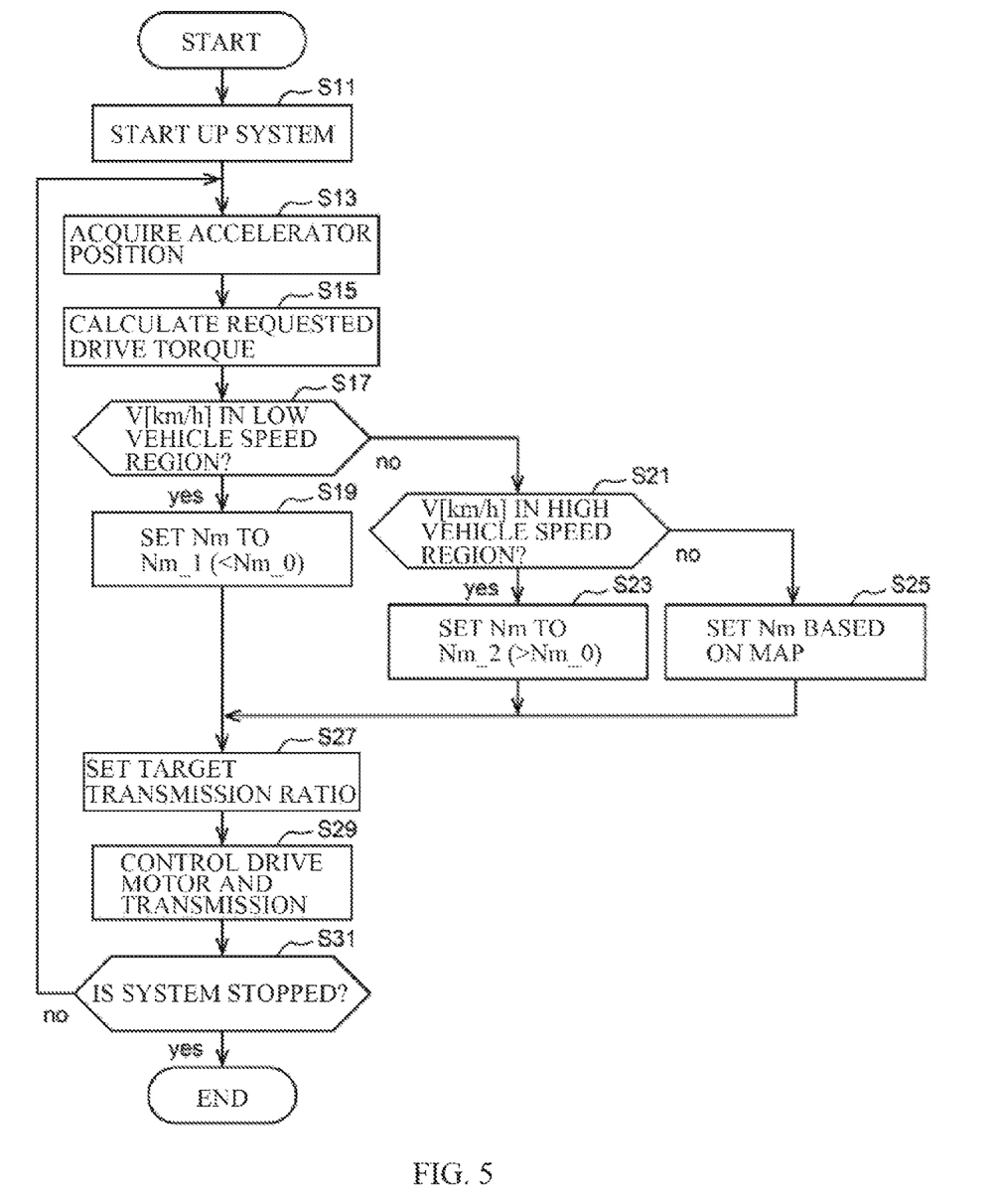
FIG. 5 is a flowchart illustrating an example of an operation of processes to be performed by the control apparatus for the vehicle illustrated in FIG. 1.

FIG. 5 is a flowchart illustrating an example of an operation of processes of controlling the drive force of the vehicle 1 to be performed by the control apparatus 60.

First, when a system of the vehicle 1 including the control apparatus 60 is started up (step S11), the accelerator position acquisition unit 71 of the processing unit 61 may executes the accelerator position acquisition process that acquires data on an accelerator position Acc, based on the sensor signal from the accelerator sensor 55 (step S13). When the vehicle 1 is in the automated driving, the accelerator position acquisition unit 71 may acquire the data on the requested acceleration rate calculated by the control device that controls the automated driving, in place of the data on the accelerator position Acc.

Thereafter, the requested drive torque calculation unit 75 may execute the process of calculating the requested drive torque of the vehicle 1, based on the accelerator position Acc (step S15). When the vehicle 1 is in the automated driving, the requested drive torque calculation unit may calculate the requested drive torque, based on the requested acceleration rate calculated by the control device that controls the automated driving.

Thereafter, the target drive amount setting unit 77 may determine whether the vehicle speed V acquired by the vehicle speed acquisition unit 73 is within the low vehicle speed region (step S17). In one example illustrated in FIG. 4, the target drive amount setting unit 77 may determine whether the vehicle speed V is equal to or lower than 50 km/h. If the vehicle speed V is within the low vehicle speed region (step S17: Yes), the target drive amount setting unit 77 may set a target rotational speed Nm of the drive motor 13 to a preset first value Nm_1 (step S19). The first value Nm_1 as the target rotational speed may be set in advance as the value less than a rotation threshold Nm_0 that allows the motor noise generated from the drive motor 13 to be blended into the background noise (Nm_1=4,000 rpm in one example of FIG. 4).

If the vehicle speed V is not within the low vehicle speed region (step S17: No), the target drive amount setting unit 77 may determine whether the vehicle speed V is within the high vehicle speed region (step S21). In one example illustrated in FIG. 4, the target drive amount setting unit 77 may determine whether the vehicle speed V is equal to or higher than 60 km/h. If the vehicle speed V is within the high vehicle speed region (step S21: Yes), the target drive amount setting unit 77 may set the target rotational speed Nm of the drive motor 13 to a preset second value Nm_2 (step S23). The second value Nm_2 as the target rotational speed may be set in advance as a value exceeding the rotation threshold Nm_0 that allows the motor noise generated from the drive motor 13 to be blended into the background noise, and as the value at which the electric power efficiency of the drive motor 13 becomes equal to or higher than the predetermined efficiency (Nm_2=10,000 rpm in one example of FIG. 4).

If the vehicle speed V is not within the high vehicle speed region (S21: No), i.e., if the vehicle speed V is in the region between the low vehicle speed region and the high vehicle speed region, the target drive amount setting unit 77 may refer to the target rotational speed map and set the target rotational speed Nm based on the vehicle speed V (step S25).

When the target rotational speed of the drive motor 13 is set in step S19, step S23, or step S25, the target drive amount setting unit 77 may set the target transmission ratio of the transmission 15 (step S27). For example, the target drive amount setting unit 77 may so set the target transmission ratio of the transmission 15 that the drive torque to be transmitted to the drive wheels 21 becomes the requested drive torque, based on the output torque of the drive motor 13 corresponding to the set target rotational speed and on the requested drive torque calculated by the requested drive torque calculation unit 75.

Thereafter, the motor control unit 79 and the transmission control unit 81 may respectively control the drive motor 13 and the transmission 15, based on corresponding one of the target rotational speed and the target transmission ratio (step S29). For example, the motor control unit 79 may control the driving of the switching devices provided in the inverter 19 based on the target rotational speed of the drive motor 13, and may so control the voltage and the current of the three-phase AC electric power to be supplied to the drive motor 13 that the rotational speed of the drive motor 13 becomes the target rotational speed. Further, the transmission control unit 81 may so adjust the pulley widths of the respective primary pulley 31 and secondary pulley 33 that the transmission ratio becomes the target transmission ratio based on the target transmission ratio of the transmission 15. Thus, the drive torque corresponding to the requested drive torque may be transmitted to the drive wheels 21.

Thereafter, the processing unit 61 may determine whether the system of the vehicle 1 is stopped (step S31). If the system is not stopped (S31: No), the processing unit 61 may cause the operation to return to step S13 to repeatedly execute the processes of the respective steps described above. If the system is stopped (S31: Yes), the processing unit 61 may end the operation of series of processes.

The control apparatus 60 according to the above-described example embodiment of the disclosure controls the rotational speed of the drive motor 13 to cause the frequency of the motor noise to be generated from the drive motor 13 to be less than a predetermined value, when the vehicle speed V is in the low vehicle speed region. Thus, it is possible to cause the frequency of the motor noise generated from the drive motor 13 to be overlapped with a frequency band of the background noise which is to be heard by the occupant as being relatively large, which helps to allow the motor noise to be blended into the background noise. When the vehicle speed V is in the high vehicle speed region, it helps to allow the generated motor noise to be blended into the background noise even if the rotational speed of the drive motor 13 becomes relatively large. Accordingly, it helps to reduce the motor noise to be heard by the occupant such as the driver.

In addition, when the vehicle speed V is in the high vehicle speed region, the control apparatus 60 according to the example embodiment of the disclosure controls the rotational speed of the drive motor 13 to cause the electric power efficiency of the drive motor 13 to be equal to or higher than the predetermined efficiency. Accordingly, it helps to improve the electric power efficiency in addition to reducing the motor noise to be heard by the occupant.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above-described example embodiment, all of the operations of the control apparatus 60 may be executed by the control apparatus 60 mounted in the vehicle 1, but a technique of at least one embodiment of the disclosure is not limited thereto. In some embodiments, all or a part of the operations of the control apparatus 60 may be executed by an external server communicably coupled to the vehicle 1.

The control apparatus 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control apparatus 60 illustrated in FIG. 1.

The invention claimed is:

1. A control apparatus for a vehicle, the control apparatus being configured to be applied to an electric vehicle and control driving of the electric vehicle, the electric vehicle being configured to transmit an output torque outputted from a drive motor to a drive wheel via a transmission, the control apparatus comprising:

one or more processors; and one or more memories communicably coupled to the one or more processors, wherein the one or more processors are configured to:

when a vehicle speed of the electric vehicle is in a predetermined low vehicle speed region, (1) control a rotational speed of the drive motor to be less than a predetermined rotation threshold such that a frequency of a motor noise generated from the drive motor becomes less than a predetermined frequency, and (2) control a transmission ratio of the transmission, under a constraint that the rotational speed of the drive motor is controlled to be less than the predetermined rotation threshold, to cause a drive torque to be transmitted to the drive wheel to be a requested drive torque; and when the vehicle speed of the electric vehicle is in a predetermined high vehicle speed region in which vehicle speeds are higher than those in the predetermined low vehicle speed region, (1) control the rotational speed of the drive motor to cause an electric power efficiency of the drive motor to be equal to or higher than a predetermined efficiency and (2) control the transmission ratio of the transmission to cause the drive torque to be transmitted to the drive wheel to be the requested drive torque.

2. The control apparatus for the vehicle according to claim 1, wherein the one or more processors are configured to:

set the rotational speed of the drive motor in the predetermined low vehicle speed region to a preset first value; and set the rotational speed of the drive motor in the predetermined high vehicle speed region to a preset second value.

3. The control apparatus for the vehicle according to claim 1, wherein the one or more processors are configured to set the rotational speed of the drive motor in the predetermined low vehicle speed region, the predetermined high vehicle speed region, or both, based on a frequency of a predetermined noise generated from the electric vehicle other than the motor noise to be generated from the drive motor.

4. An electric vehicle configured to transmit an output torque outputted from a drive motor to a drive wheel via a transmission, the electric vehicle comprising a control apparatus configured to:

when a vehicle speed of the electric vehicle is in a predetermined low vehicle speed region, (1) control a rotational speed of the drive motor to be less than a predetermined rotation threshold at which a frequency of a motor noise to be generated from the drive motor becomes less than a predetermined frequency and (2) control a transmission ratio of the transmission, under a constraint that the rotational speed of the drive motor is controlled to be less than the predetermined rotation threshold, to cause a drive torque to be transmitted to the drive wheel to be a requested drive torque; and when the vehicle speed of the electric vehicle is in a predetermined high vehicle speed region in which vehicle speeds are higher than those in the predetermined low vehicle speed region, (1) control the rotational speed of the drive motor to cause an electric power efficiency of the drive motor to be equal to or higher than a predetermined efficiency and (2) control the transmission ratio of the transmission to cause the drive torque to be transmitted to the drive wheel to be the requested drive torque.

5. A non-transitory computer readable recording medium containing a computer program to be applied to a control apparatus for an electric vehicle, the electric vehicle being configured to transmit an output torque outputted from a drive motor to a drive wheel via a transmission, the computer program causing, when executed by one or more processors, the one or more processors to implement a method, the method comprising:

determining whether a vehicle speed of the electric vehicle is in a predetermined low vehicle speed region or a predetermined high vehicle speed region in which vehicle speeds are higher than those in the predetermined low vehicle speed region;

when the vehicle speed of the electric vehicle is in the predetermined low vehicle speed region, (1) controlling a rotational speed of the drive motor to be less than a predetermined rotation threshold at which a frequency of a motor noise to be generated from the drive motor becomes less than a predetermined frequency, and (2) controlling a transmission ratio of the transmission, under a constraint that the rotational speed of the drive motor is controlled to be less than the predetermined rotation threshold, to cause a drive torque to be transmitted to the drive wheel to be a requested drive torque; and when the vehicle speed of the electric vehicle is in the predetermined high vehicle speed region, (1) controlling the rotational speed of the drive motor to cause an electric power efficiency of the drive motor to be equal to or higher than a predetermined efficiency, and (2) controlling the transmission ratio of the transmission to cause the drive torque to be transmitted to the drive wheel to be the requested drive torque.

6. The control apparatus for the vehicle according to claim 1, wherein the predetermined frequency is determined based on a noise expected to be generated during traveling of the vehicle other than the motor noise generated from the drive motor.

7. The electric vehicle according to claim 4, wherein the predetermined frequency is determined based on a noise expected to be generated during traveling of the vehicle other than the motor noise generated from the drive motor.

8. The non-transitory computer readable recording medium according to claim 5, wherein the predetermined frequency is determined based on a noise expected to be generated during traveling of the vehicle other than the motor noise generated from the drive motor.

* * * * *